Oct. 17, 1967  R. G. HALL  3,347,176
METHOD AND APPARATUS FOR MAKING PATTIES
Filed Oct. 22, 1964  7 Sheets-Sheet 1

INVENTOR
Robert G. Hall
By Zabel, Baker, York,
Jones and Kilchner
Att'ys

Oct. 17, 1967  R. G. HALL  3,347,176
METHOD AND APPARATUS FOR MAKING PATTIES
Filed Oct. 22, 1964  7 Sheets-Sheet 4

INVENTOR
Robert G. Hall
By Zabel, Baker, York,
Jones and Dithmar
Att'ys

United States Patent Office 3,347,176
Patented Oct. 17, 1967

3,347,176
METHOD AND APPARATUS FOR MAKING PATTIES
Robert G. Hall, Villa Park, Ill., assignor to Formatic, Inc., Chicago, Ill., a corporation of Illinois
Filed Oct. 22, 1964, Ser. No. 405,785
23 Claims. (Cl. 107—4)

This invention relates to a method and automatic apparatus for making patties of plastic material such, for example, as ground meat, fish, pastry and the like. The method and apparatus are suited particularly for making patties of ground beef or pork, either alone or combined with desired additives.

Various prior methods and apparatus for making patties of ground meat, such as hamburger, tend to produce patties that are highly compacted and thus of high density. The pressures used in molding the patties are of such magnitude that much of the natural juices present are squeezed out of the meat. The resultant patty is comparatively hard and relatively dry. Such patties require longer cooking time, and do not cook as uniformly or taste as flavorful as less compacted patties containing more juices.

One object of the invention, therefore, is to provide a method and apparatus for making meat patties wherein the resultant patties are less compacted and have lower density than patties made by such prior apparatus. The patties made by this invention are "fluffy" in character, and possess substantially all the juices originally present in the component ground meat. Such patties tend to cook more uniformly throughout, and have desirable juicy and savory characteristics.

Another object of the invention is to provide such a method and apparatus wherein the resultant patties are of substantially uniform weight, shape, size and appearance.

Another object is to provide a method and apparatus capable of making improved patties at faster rates than prior methods and apparatus. Apparatus embodying the invention functions at rates up to 4500 patties per hour, and more.

Another object is to provide a method and apparatus for making patties wherein two patties are in process during each method and apparatus cycle.

Another object of the invention is to provide apparatus that easily may be adjusted to accommodate plastic materials of different compositions and physical characteristics. Adjustments also may be made in respect to temperature of the plastic material and ambient room temperature.

Another object is to provide apparatus that readily may be conditioned to produce meat patties falling in a wide range as to size. Each patty size requires but a single change part, and minor apparatus adjustment, if any. The feasible size range is from 2–3 patties per pound to 12–16 per pound.

Still another object is to provide apparatus for making patties that readily may be cleaned following a period of use, or between runs using plastic materials of different composition.

Another object is to provide apparatus for making patties wherein the finished patties are deposited on separative sheets of paper or the like which may be derived from a roll of strip material mounted in the apparatus. An individual sheet is cut from the strip material simultaneously with the deposit of each patty.

Another object is to provide in such apparatus means for crimping or crinkling the longitudinal edges of the separative sheets, such means effective to feed the strip material horizontally in mid-air to the deposit station. As will be understood, the crinkled edges facilitate ultimate separation and handling of the patties.

Other objects, advantages and details of the invention will be apparent as the description proceeds, reference being had to the accompanying drawings wherein one embodiment of the apparatus invention is shown, together with certain variations. It will be understood that the description and drawings are illustrative only, and that the scope of the invention is to be measured by the appended claims.

The method of the invention will be described first, followed by a description of the illustrated apparatus and certain variations thereof.

*Description of method*

The method of the invention includes the following steps:

A measured quantity of plastic material first is separated from a larger amount, the measured quantity preferably being slightly larger than that contained in the finished patty. This slight excess insures that the finished patty will not be deficient in weight, size or shape, thereby tending toward a high degree of uniformity.

The next step involves transferring the measured quantity of material laterally to a molding station. During this step the material has no particular shape or size characteristic.

Next, the separated and transferred material is placed under a substantially constant gentle pressure and pressed into a mold of desired shape and size, the material completely filling the mold.

Excess material is pressed laterally out of the molding station, and returned with the following quantity of material.

The filled mold then is transferred laterally to a discharge station. In some instances the plastic material is supported in the mold during the transfer, and in others the material is self-supporting so external support is unnecessary.

The next step involves ejecting the patty from the mold, the patty falling by gravity to a place of repose such as a conveyor, for example. This ejecting step usually includes the step of feeding a separative sheet of paper or the like in mid-air to the region below the mold and cutting the sheet, each patty falling on an individual sheet.

In the method used by the illustrated apparatus, strip material is fed from a supply roll, crinkled on lateral edges, flanged and directed horizontally in mid-air to the region below the mold, and a sheet is severed by a knife travelling on a circular arc from the strip in timed relation with each ejecting step. The step of crinkling the lateral edges of the strip material serves both to feed the strip and provide a separative sheet offering advantages from the storage and handling standpoints.

During the period the filled mold is transferred laterally to the discharge station and the patty ejected, the steps of separating a measured quantity of plastic material from the larger amount and transferring same laterally take place. Thus, two patties are in process in each method cycle, and one patty is ejected per cycle. This feature contributes in part to the high production rate obtainable with the method of the invention.

*Description of apparatus*

One form of apparatus embodying the invention is illustrated in detail in the drawings. This apparatus now will be described, together with certain variations in structural and functional detail.

Referring to the drawings, apparatus embodying the invention includes a suitable support generally designated 25. As shown in FIGS. 4–6 and 9, support 25 includes, broadly speaking, an upper support portion 26 and a lower support portion 27. In general, upper support portion 26 carries the apparatus parts that cooperate to form the patties, while lower support portion 27 carries the drive and timing parts of the apparatus.

Major emphasis in the following description will be placed on those apparatus parts that cooperate to form the patties. The drive and timing parts are more or less conventional, and detailed description thereof will be given only when necessary to clarify the structure and function of the patty forming parts.

Figure 1:
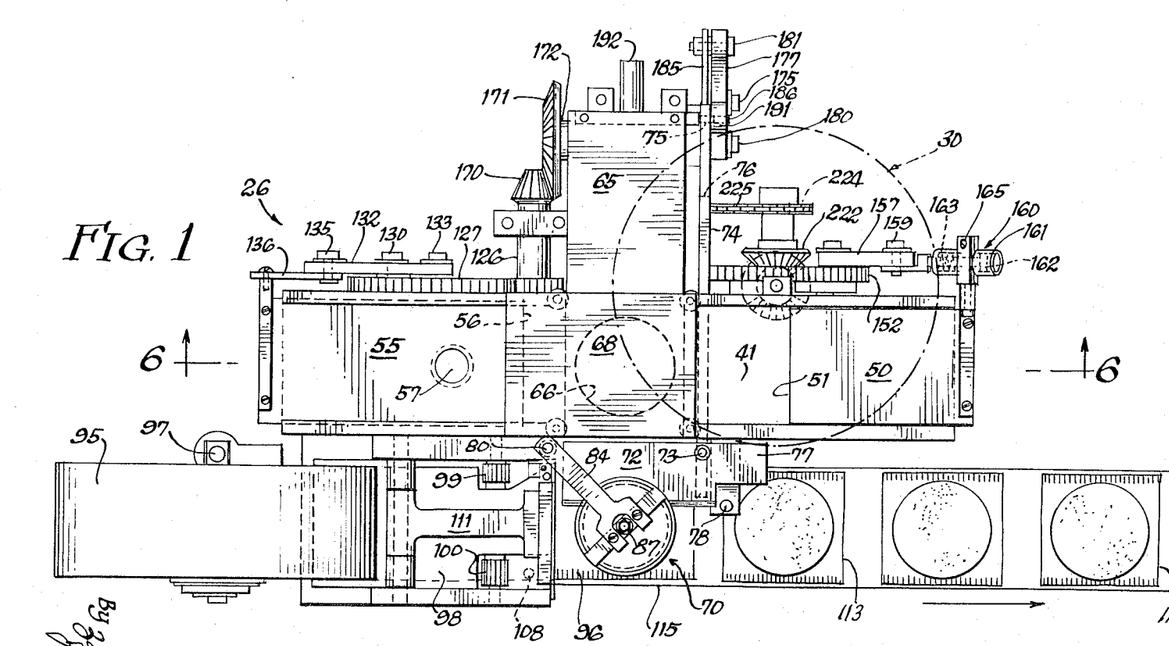
FIG. 1 is a top plan view of apparatus for making patties embodying the invention, the feed hopper in broken line.

Referring first to FIG. 1, upper support portion 26 carries a cylindrical hopper 30 shown in broken lines. Hopper 30, which will be described in greater detail later, is adapted to contain a supply of plastic material, for example, ground beef. Charges of material are added to hopper 30 from time to time as needed during operation of the apparatus.

Hopper bottom 31 has an off-center exit opening 32 for the discharge of plastic material contained within the hopper. An adjustable gate 33, best shown in FIGS. 7 and 8, has sliding relation with bottom 31 to vary the effective size of opening 32. This adjustment, of course, is set in response to desired patty size and to some extent the characteristics of the material.

Figure 7:
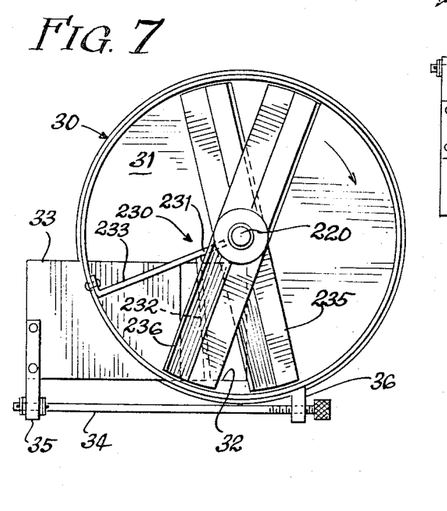
FIG. 7 is a plan view of the hopper and feed mechanism within the hopper.
Figure 8:
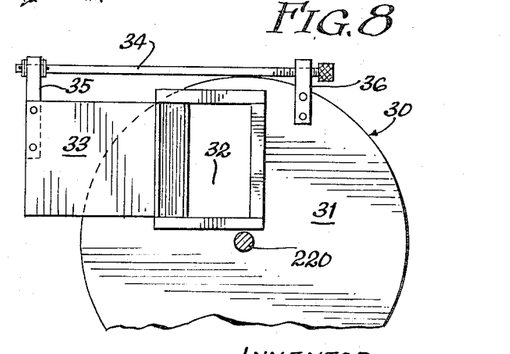
FIG. 8 is a fragmentary bottom view of the hopper showing the adjustable gate associated with the opening in the hopper bottom.

As shown in FIGS. 7 and 8, an adjusting screw 34 is provided to vary the longitudinal position of gate 33 with respect to opening 32, screw 34 extending between an arm 35 on gate 33 and an arm 36 on hopper 30. The remaining elements shown in FIG. 7 that cooperate to discharge measured quantities of material from the hopper during apparatus operation will be described later.

Figure 6:
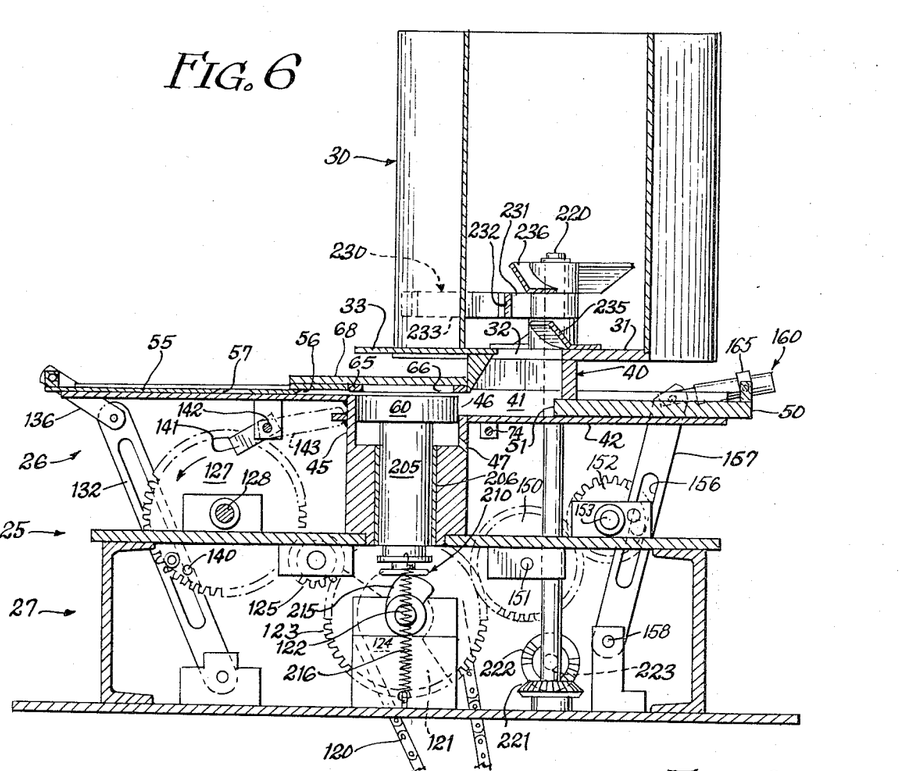
FIG. 6 is a longitudinal sectional view on line 6—6 of FIG. 1.
Figures 11, 12, 13, 14, 15, 16, 17:
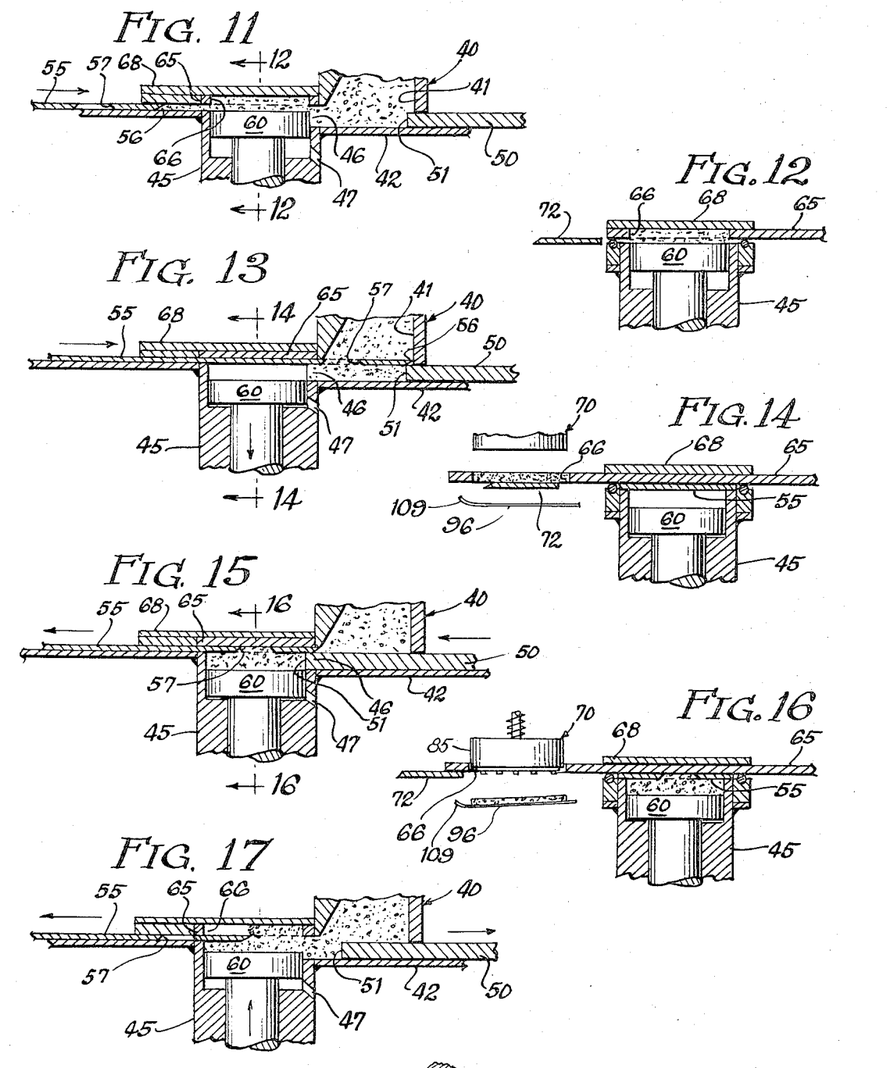
FIG. 11 is a fragmentary sectional view showing one step in the formation of a patty and the structure of the illustrated apparatus associated with that step.
FIG. 12 is a sectional view on line 12—12 of FIG. 11.
FIG. 13 is a fragmentary sectional view showing another step and the structure of the illustrated apparatus associated with that step.
FIG. 14 is a sectional view on line 14—14 of FIG. 13.
FIG. 15 is a fragmentary sectional view showing another step and the structure of the illustrated apparatus associated with that step.
FIG. 16 is a sectional view on line 16—16 of FIG. 15.
FIG. 17 is a fragmentary sectional view showing another step and the structure of the illustrated apparatus associated with that step.

As best shown in FIGS. 6 and 11, means 40, including the vertical and inclined walls thereof shown in section, define a receiving means or compartment 41 below hopper opening 32. Measured quantities of material discharged through opening 32 are received successively in compartment 41. A fixed plate 42 constitutes the bottom of compartment 41 and is a part of upper support portion 26.

Still referring to FIGS. 6 and 11, a hollow cylinder 45, carried vertically on upper support portion 26, is located laterally adjacent compartment 41. Cylinder 45 extends somewhat above the level of compartment bottom 42, and the cylinder wall facing compartment 41 is relieved as shown at 46 so that the material on compartment bottom 42 may be transferred readily to the interior of the cylinder. The wall of cylinder 45 near the bottom of the hollow portion has an air vent 47 which provides pressure relief during operation of a piston that will be described later.

The illustrated means for transferring the measured quantity of material from compartment 41 to the interior of cylinder 45 includes a feed plate 50 that reciprocates in suitable bearings between an "out" position shown generally in FIG. 6 and the "in" position where forward edge 51 is adjacent relieved portion 46 of cylinder 45, as shown in FIG. 15.

In one commercial form of the invention a cut-off plate 55 (FIGS. 1, 4–6, 11 and 13–17) cooperates with the hopper feed mechanism (to be described later) and feed plate 50 to deposit a measured quantity of material in compartment 41 and transfer same to the interior of cylinder 45. Cut-off plate 55, as illustrated, reciprocates in suitable bearings from the "out" position illustrated in FIGS. 6 and 11 to an "in" position (FIG. 13) where its leading edge 56 is adjacent leading edge 51 of feed plate 50 when the latter is in the position shown in FIG. 6. Cut-off plate 55 has an opening 57 (FIGS. 1, 6, 11, 13, 15, 16 and 17) spaced inwardly from leading edge 56, the purpose for which will be described later.

When the leading edges 51 and 56 of feed plate 50 and cut-off plate 55 are more or less aligned, as mentioned above and shown in FIG. 13, a measured quantity of plastic material is trapped in the bottom of compartment 41. Cut-off plate 55 overlies the material and helps prevent it from being forced upwardly in the compartment as it is transferred to cylinder 45. The quantity of trapped material, as previously mentioned, is slightly larger than that contained in a finished patty.

Still referring to FIG. 6, and viewing cut-off plate 55 at the "in" position shown in FIG. 13, plates 50 and 55 then are moved to the left simultaneously by drive means that will be described later. The leading edge 51 of plate 50 is effective to push the material partly into the mold plate opening, next to be described, and partly into cylinder 45 where the material is deposited on the upper face of a piston 60 that reciprocates within cylinder 45. Piston 60 is shown in extended or upper position in FIG. 6, and it will be understood that the piston is in retracted or lower position at the time the material enters cylinder 45, as shown in FIGS. 13 and 15.

Referring to FIGS. 1, 4, 5, 6 and 9–16, a mold plate 65 having a mold opening 66 is disposed above the top of cylinder 45. Mold plate 65 may be one of a family of several mold plates, the respective plates differing in thickness and diameter of mold opening so as to enable the apparatus to form patties of different sizes. The diameter of mold opening 66, while subject to variation as stated, is generally the same as the internal diameter of cylinder 45. Mold plate 65 is the previously mentioned change part that cooperates to determine patty size, shape and weight.

A top plate 68 overlies mold plate 65 and cooperates with the mold plate and piston 60 to define a mold when mold opening 66 is aligned with cylinder 45, as will be understood.

Mold plate 65 reciprocates back and forth in suitable bearings, including roller bearing 69 (FIG. 10) located at one side of cylinder 45, at right angles to the direction of movement of feed plate 50 and cut-off plate 55. The travel path of mold plate 65 is from an "in" position shown in FIG. 1 (opening 66 in general alignment with cylinder 45) and an "out" position where opening 66 is in alignment with a patty ejecting means 70.

When the measured quantity of material is transferred laterally by feed plate 50 and deposited in cylinder 45 on piston 60, mold plate 65, in some instances, is in "out" position, and the preceding patty is being ejected by means 70, as shown in FIGS. 14 and 16. Cut-off plate 55 continues to move toward "out" position thereby clearing the upper end of cylinder 45, while feed plate 50 returns rapidly to "out" position where it dwells for a period of about one-half cycle of apparatus operation. The rapid return of plate 50 and the action of piston 60 avoid removal of material from cylinder 45, other than the discharge of excess material.

Simultaneously with the above, piston 60 starts to rise and mold plate 65 returns rapidly to "in" position. Piston 60 initially urges the material in cylinder 45 against the overlying and moving bottom of mold plate 65, and when mold opening 66 enters the upper end of cylinder 45, piston 60 presses the plastic material into the mold opening. As will be seen, piston 60 applies a constant and comparatively light pressure, thus producing a "fluffy" patty of comparatively low density, and one containing most if not all of the original juices in the case of ground meat material.

In the present embodiment of the apparatus, piston 60 is designed to rotate as it moves upwardly and presses the material into the mold opening. The rotation feature minimizes both wear between the piston and cylinder and the tendency of the material to adhere to the face of piston 60. It also aids in distributing the material evenly in mold opening 66. With certain materials, it is particularly desirable to provide piston rotation during the pressing stroke, whereas with other materials rotation is less important.

Immediately following the mold filling operation of the illustrated apparatus, cut-off plate 55 moves rapidly to the right, looking at FIGS. 6 and 11, and travels immediately below mold plate 65 at high speed. Piston 60 may always be below the travel path of cut-off plate 55, or piston 60 may first start its return stroke to provide clearance for cut-off plate 55.

Cut-off plate 55 in travelling across the top of cylinder 45 effects separation between the material in mold opening 66 and the face of piston 60, thereby completing formation of a patty which at this time is in the mold defined by cut-off plate 55, opening 66 in mold plate 65 and top plate 68.

Meanwhile, as mentioned, feed plate 50 has returned to its "out" position as shown in FIG. 6, and a subsequent measured quantity of material has been admitted to compartment 41. Cut-off plate 55 continues its travel toward the right to "in" position, and again traps a measured quantity of material at the bottom of compartment 41 in front of edge 51 of feed plate 50.

As soon as leading edge 56 of cut-off plate 55 travels beyond piston 60 in a direction to the right, or even slightly before, mold plate 65 starts its travel toward "out" position, ultimately bringing mold opening 66 and the patty contained therein directly below ejecting means 70.

Referring again to FIG. 10, previously mentioned roller bearing 69 is engaged by the lower surface of mold plate 65. As the mold plate travels to the right toward "out" position, bearing 69 rotates with a surface speed generally equal to that of the mold plate. The patty in mold opening 66 wipes across bearings 69, and because the bearing is rotating with more or less similar surface speed, there is no tendency for the patty to pull out of the mold opening as the patty and mold plate 65 exit from cylinder 45.

Some materials, and patties of some diameters and thicknesses, lack sufficient body and stickiness to be self-sustaining in mold opening 66. Such patties have a tendency to drop from the mold plate, in the absence of support, before mold opening 66 reaches ejecting position. Thus, in some instances, it is desirable to provide a support for the patty during this travel distance.

Referring to FIG. 1, a patty support plate 72 is carried by and pivoted at 73 to a member 74 that travels with mold plate 65 during a portion of the time mold opening 66 is exterior of cylinder 45. A pin 75 (FIG. 9) on a downwardly extending lug of mold plate 65 travels in a slot 76 in member 74, providing a lost motion connection so that support plate 72 remains stationary until mold opening 66 overlies the plate.

Support plate 72 has finger 77 that engages a fixed pin 78 as mold opening 66 approaches alignment with ejecting means 70. Continued movement of mold plate 65 causes rotation of support plate 72 on its pivot 73, and by the time mold opening 66 becomes aligned with ejecting means 70, support plate 72 has moved away from beneath the opening.

In apparatus designed to make extremely thin patties, support plate 72 may be omitted in favor of a stream of pressurized air directed from air vent 47 of cylinder 45 to the region below mold plate 65 and between cylinder 45 and ejecting means 70.

As previously mentioned, when mold plate 65 reaches "out" position and stops, mold opening 66 is at the discharge station immediately below ejecting means 70 (FIGS. 1, 14, 16 and 20). At this time, ejecting means 70 moves rapidly downward, striking the patty and ejecting same from opening 66.

Figures 20, 21, 22:
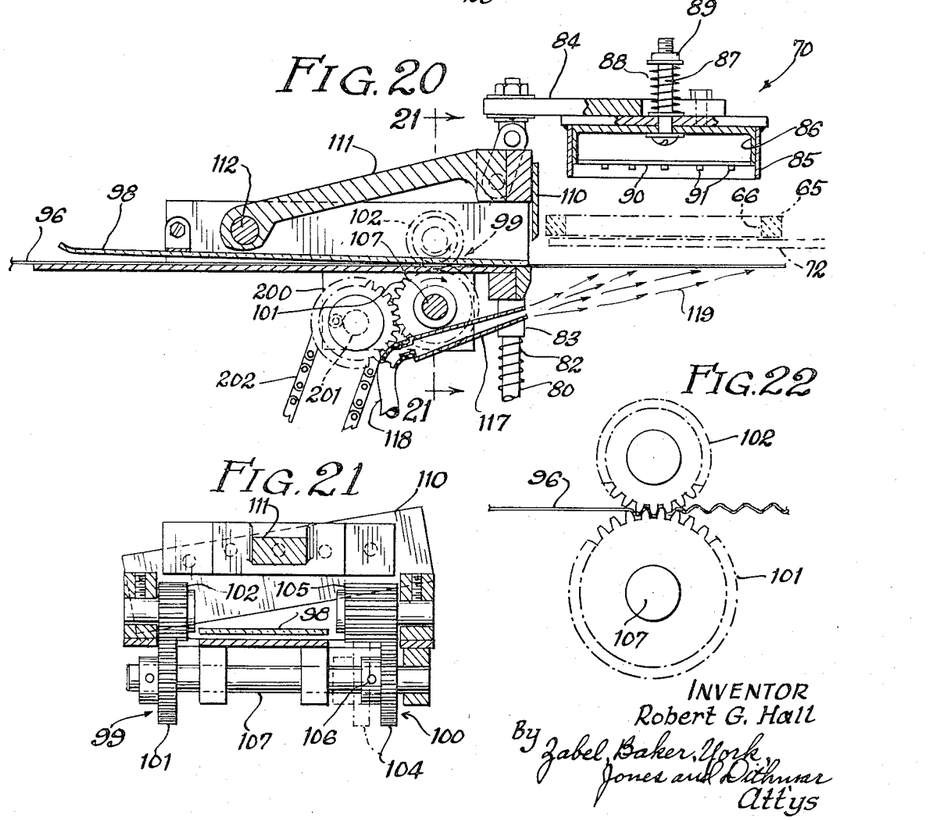
FIG. 20 is a sectional view on line 20—20 of FIG. 19, the figure also showing exemplary means for ejecting the formed patty.
FIG. 21 is a sectional view on line 21—21 of FIG. 20.
FIG. 22 is a fragmentary end elevational view of one set of gears employed to transport and crinkle the strip material.

Referring to FIG. 20, the illustrated ejecting means 70 is carried at the top of a vertical rod 80 that reciprocates in suitable bearings, one a lower bearing 81 (FIGS. 4, 5 and 9) mounted on lower support portion 27. A spring 82 surrounds rod 80 and extends between bearing 81 and an enlargement or collar 83 on the upper part of rod 80. Spring 82 serves to raise rod 80 and associated ejecting means 70 after they have been lowered for ejecting action in a manner to be described later.

Continuing with the description of the illustrated ejecting means 70, a horizontal arm 84 (FIG. 20) mounted on the top of rod 80 carries an annular member 85 of external diameter slightly smaller than the diameter of mold opening 66. The stroke of rod 80 and annular member 85 is such that the latter engages the patty with a sharp knock-out blow and enters opening 66 to a limited extent (FIG. 16). This action usually is enough to eject the patty.

In the form illustrated in FIG. 20 and elsewhere, ejecting means 70 includes a second annular member 86 that interiorly telescopes member 85. Member 86 is mounted in retracted manner within member 85 by means of an axial pin 87 and a surrounding spring 88 that extends between arm 84 and an adjusting nut 89 on pin 87. In use, annular member 86, traveling downward under its own inertia after member 85 stops, engages the patty and delivers to it a second knock-out blow. Thus, discharge of the patty is insured.

Figure 18:
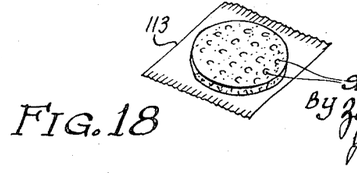
FIG. 18 is a perspective view showing a finished patty applied to a separative sheet.

As shown in FIG. 20, second annular member 86 may have a plurality of parallel wires or thin rods 90 at its lower end, each rod carrying a plurality of downwardly extending spaced pins 91 of short length. The pins on adjacent rods 90 preferably are staggered, as indicated by depressions 92 (FIG. 18) scored on the finished patty by the pins. The depressions enable the patties to cook rapidly because of improved heat penetration.

As previously mentioned, it is desirable to deposit the patty on a separative sheet of paper or the like for convenience in storage, separation and handling. In the form of the invention shown, such sheets are derived from a roll of strip material, and an individual crinkled and flanged sheet is cut from the strip as each patty is ejected from mold plate 65.

Figure 4:
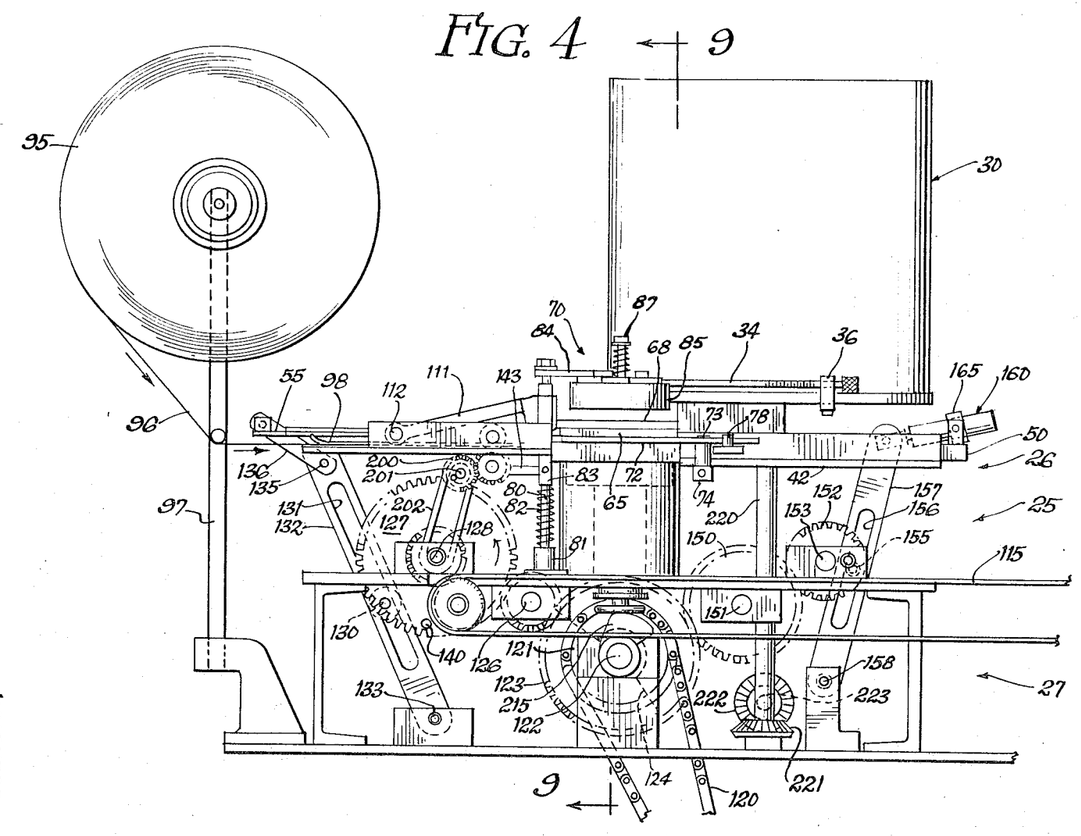
FIG. 4 is a front elevational view of the apparatus shown in FIG. 1.

Referring to FIGS. 1 and 4, a roll 95 of strip material 96 is carried on a post 97 mounted on lower support portion 27. The free end of strip material 96 travels beneath a guide plate 98, and the lateral margins of the material engage spaced pairs 99 and 100 of loosely meshing gears. Pair 99, as best shown in FIG. 21, includes lower gear 101 and upper gear 102, while pair 100 includes lower gear 104 and upper gear 105. As shown, upper gear 105 of the latter pair has increased axial length, and lower gear 104 is adjustably mounted by means of set screw 106 on shaft 107. The adjustment, of course, enables the apparatus to utilize strip material of various widths so the separative sheets may have suitable size in relation to the patties.

Gears 101, 102, 104 and 105 serve both to feed the strip material positively to the region below ejecting means 70 and to crimp or crinkle the lateral edges of the material so the separative sheets are more satisfactory for storage and handling purposes. In addition, the crinkled edges impart increased stiffness to the strip material, enabling use of thinner stock, if desired.

Figure 9:
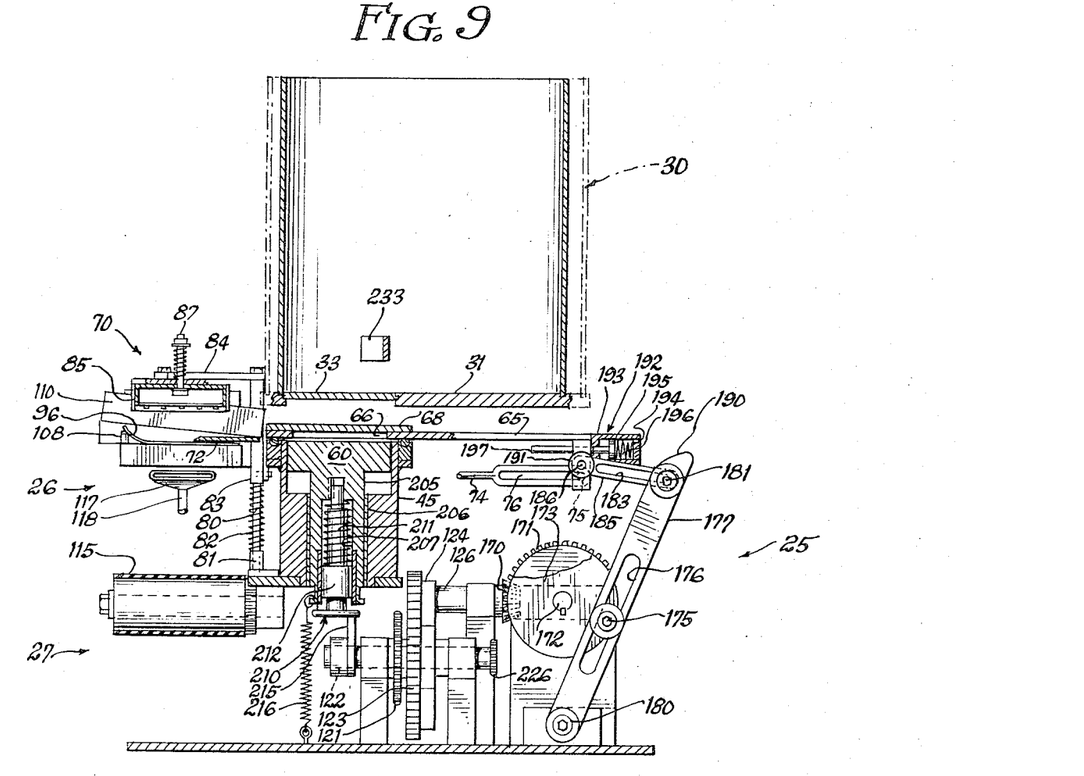
FIG. 9 is a transverse sectional view on line 9—9 of FIG. 4, the displaced hopper shown in phantom by broken line.
Figure 10:
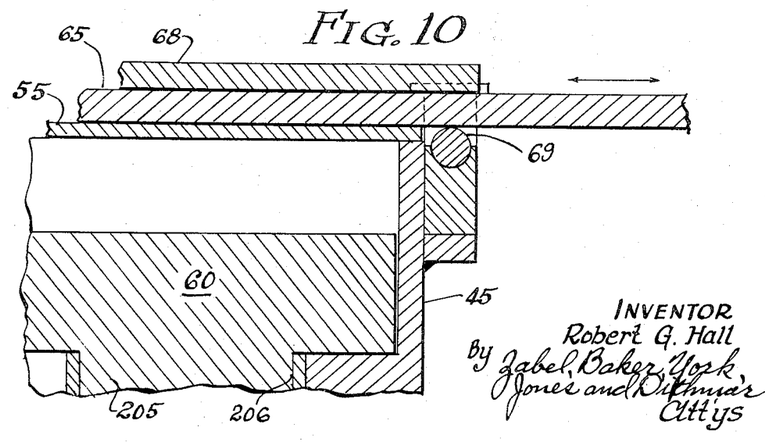
FIG. 10 is an enlarged fragmentary sectional view showing certain details of the invention.
Figure 19:
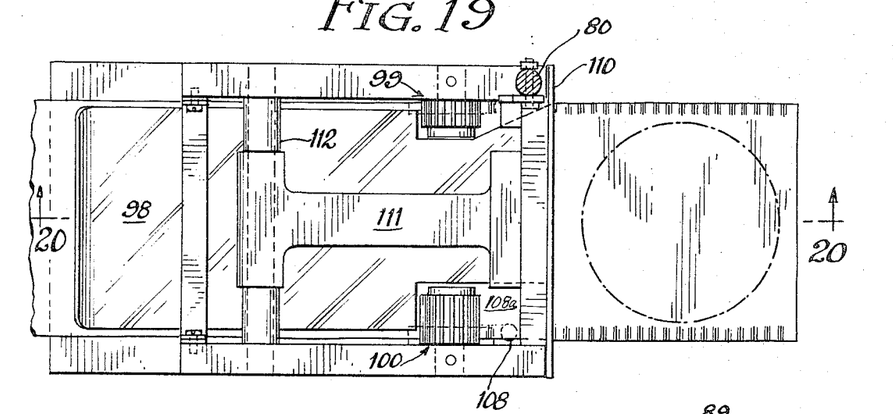
FIG. 19 is an enlarged top plan view of the mechanism for feeding, crinkling and cutting the strip material on which the patties are deposited.

As shown in FIGS. 1, 9 and 19, a pin 108 or the like is positioned forwardly of gears 104 and 105 and a little above the bite between them. The adjacent lateral margin of the traveling strip material 96 rides on pin 108 and is bent upwardly, forming in effect a reinforcing flange 109 (FIG. 14) that tends to maintain the material in horizontal mid-air position below mold plate 65. Guide plate 98, which is relieved adjacent pin 108 as shown at 108a, serves to hold down the remainder of material 96 so flange 109 may be formed at the lateral margin.

Figure 2:
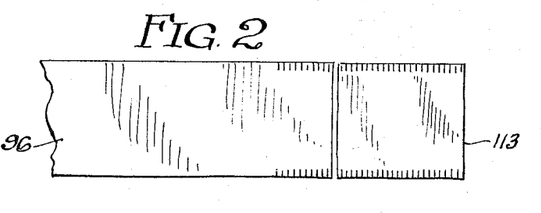
FIG. 2 is a fragmentary plan view of strip material used in the illustrated form of the invention to provide separative sheets for the patties, the figure showing the crinkling applied to the longitudinal edges and a shear line indicating the relative position of knife action.
Figure 3:
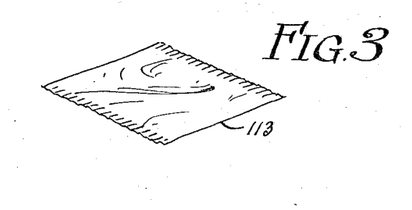
FIG. 3 is a perspective view of a severed separative sheet that receives a formed patty.

The free end of strip material 96 is fed by the gears described above horizontally in mid-air to the discharge region, as shown in FIG. 20. A knife 110, carried on a frame 111 pivoted at 112, is actuated by the rod 80 that also actuates ejecting means 70. Thus, knife 110, which travels on a circular arc, severs a sheet 113 (FIGS. 1–3) from strip material 96 more or less simultaneously with the discharge of a patty from mold plate 65. The patty and sheet 113 meet in mid-air and fall through a short distance to a place of repose such as conveyor 115 (FIGS. 1 and 9) mounted on lower support portion 27.

As shown in FIGS. 9 and 20 (and omitted in other figures for clarity), a flattened nozzle 117 at the end of a tube 118 may be mounted below knife 110 to direct a stream of air at the underside of the free end of strip material 96. The air flow from nozzle 117, indicated by arrows 119 in FIG. 20, gives support, if needed, to the free end of material 96, augmenting the action of marginal flange 109. The timing of the apparatus is such that pressurized air for nozzle 117 may be derived from cylinder 45. Tube 118, therefore, may be connected to air vent 47 of the cylinder, although any suitable source of air under pressure is contemplated.

The driving and timing mechanisms of the apparatus next will be described, following which further details and various modifications will be set forth.

Figure 5:
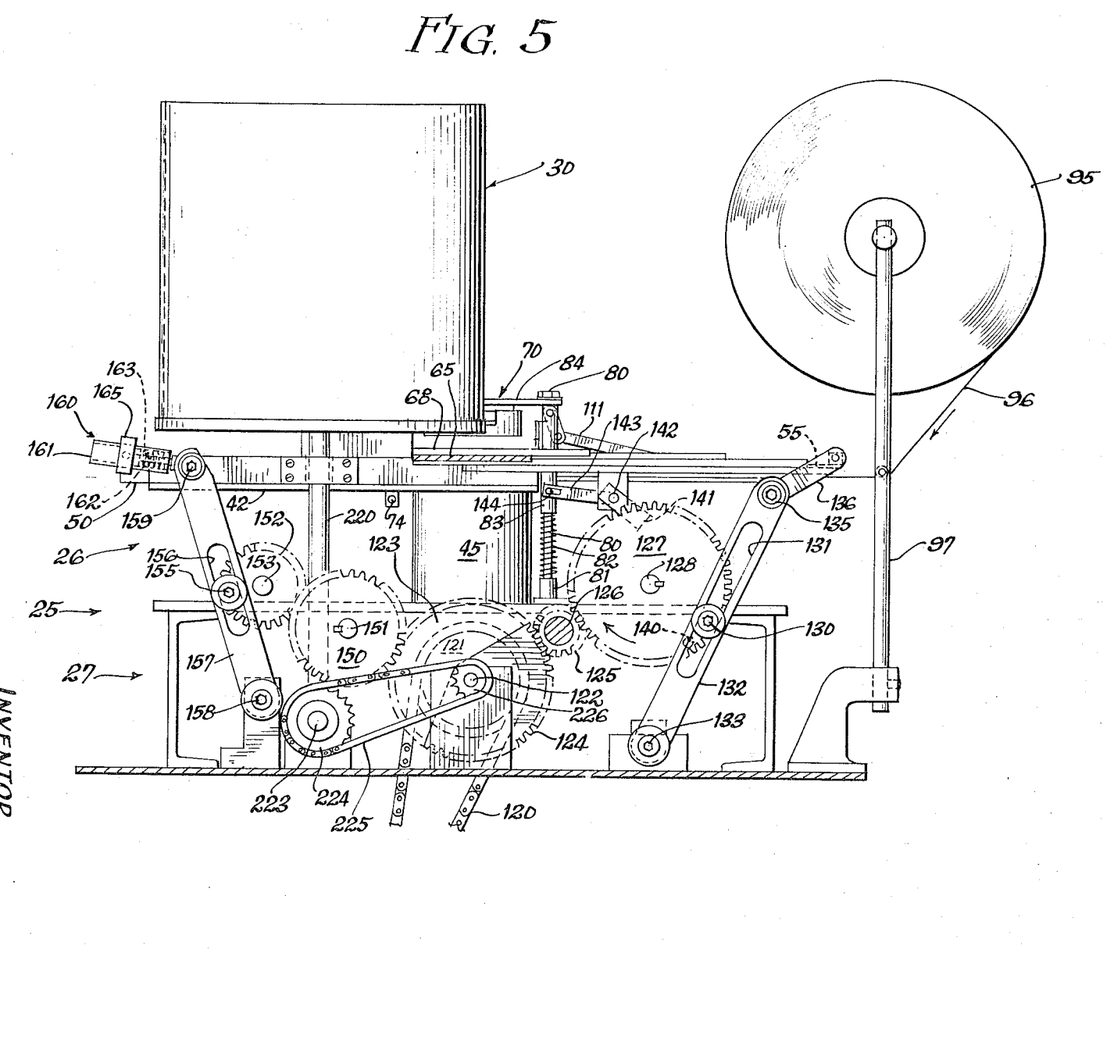
FIG. 5 is a rear elevational view, partly in section, of the apparatus shown in FIG. 1.

Referring to FIGS. 4, 5 and 6, a suitable electric motor (not shown) is connected by means of drive chain 120 to a drive sprocket wheel 121 on main drive shaft 122. This sprocket wheel and shaft are rotated at constant speed during operation of the apparatus.

Shaft 122 carries two large gears in side-by-side relation, one a circular gear 123 and the other a segment gear 124. These gears are best shown in rear elevation in FIG. 5 and in side elevation in FIG. 9.

Circular gear 123 (FIG. 5) engages an idler gear 125 carried on shaft 126, gear 125 meshing with a larger gear 127 of radius equal to that of gear 123. Gear 127 is mounted on a shaft 128.

Gear 127 has an off-center pin or stud 130 that slides in a slot 131 in a lever arm 132 pivoted at its lower end on a shaft 133. The other end of lever arm 132 is pivoted at 135 to a link 136 connected to cut-off plate 55. Thus cut-off plate 55, when connected, travels continuously back and forth during apparatus operation, the travel speed changing during a cycle of apparatus operation by reason of the pin and slot drive mechanism.

Gear 127 carries a small pin or stud 140 (FIGS. 4, 5 and 6) near its periphery. Pin 140 travels in a circular path, and once each cycle engages an arm 141 (FIGS. 5 and 6) carried on a rotatable shaft 142. Shaft 142 carries a second arm 143 that is connected to rod 80 of ejecting means 70. Rod 80 has a pin 144 that rides in a slot in arm 143.

Each time pin 140 on gear 127 engages and displaces arm 141, shaft 142 and arm 143 rotate in counterclockwise direction, referring to FIG. 5, thereby causing rod 80 to be lowered with abrupt or snap action. This stroke, as previously mentioned, actuates ejecting means 70 and knife 110, after which spring 82 is effective to raise ejecting means 70 and knife 110 to initial position. Thus, there is one ejecting movement of means 70 and one cutting action of knife 110 during each cycle of apparatus operation.

Referring to FIGS. 4, 5 and 6, segment gear 124 periodically meshes with circular idler gear 150 carried on a shaft 151. Gear 150, in turn, meshes with gear 152 on shaft 153. Gear 152 has a stud 155 that extends into a slot 156 in a lever arm 157. The lower end of arm 157 is pivoted on shaft 158, and the upper end is pivoted at 159 to a yieldable link 160 that comprises a pair of external and internal telescoping members 161 and 162 connected by a spring 163.

A clamp 165 mounted on feed plate 50 is connected to external member 161 of yieldable link 160, the clamp engageable with the link at various positions. The adjustment provided by link 160 and clamp 165 determines the initial relationship between feed plate 50 and compartment 41 below exit opening 32 of hopper 30, and is a factor in measuring the material taken from the hopper. As will be understood, feed plate 50 travels back and forth as gear 152 rotates, the feeding pressure applied by plate 50 to the material transferred to cylinder 45 being determined in part by spring 163 in link 160. Thus, spring 163 provides overload protection, and in part controls the amount of material pushed into mold opening 66 by the feed plate.

The travel of feed plate 50 is intermittent during a cycle of apparatus operation due to the presence in the gear train of segment gear 124. The gear size relationships are such that feed plate 50 travels through its complete cycle during approximately a one-half cycle of apparatus operation, the feed plate remaining in a state of dwell during the remaining half of the apparatus cycle.

The drive train for mold plate 65 starts with a bevel gear 170 (FIG. 9) carried on shaft 126, the shaft that also carries idler gear 125 in the drive train for cut-off plate 55. Still referring to FIG. 9, bevel gear 170 meshes with a larger bevel gear 171 that is carried on and drives a shaft 172. A disc 173 keyed on shaft 172 has a pin or stud 175 that travels within a slot 176 in a lever arm 177. The lower end of lever arm 177 is pivoted on a shaft 180, and the upper end carries a pin 181. Pin 181, in turn, travels in a guide slot 183 in a link 185 which is pivoted on a pin 186 carried by mold plate 65.

As previously mentioned, mold plate 65 travels back and forth between positions where mold opening 66 is aligned respectively with cylinder 45 and ejecting means 70. Plate 65, of course, must dwell momentarily at both ends of its travel path, first to allow the plastic material to be pressed into the mold opening, and second to allow time for ejecting means 70 to function. These dwell periods are provided for by means of the lost motion connection between lever arm 177 and mold plate 65 comprising the pin 181 and slot 183 between arm 177 and link 185.

To reduce wear, particularly at the higher speeds of apparatus operation, lever arm 177 has a cam 190 (FIG. 9) that engages a roller 191 on pin 186 of mold plate 65 and pushes the plate to the left.

Referring to FIGS. 1 and 9, particularly the latter, the outer end of mold plate 65 is provided with an inertia damping mechanism 192. As shown, this mechanism includes a cylinder 193 having an air vent 194 near its outer end, a piston 195 within the cylinder and a spring 196 that returns piston 195 to the left. A piston rod 197 extends toward main compression cylinder 45, and, when mold plate 65 approaches "out" position, piston rod 197 engages cylinder 45, thereby stopping travel of piston 195. Plate 65 and cylinder 193 continue to the left, and air is compressed within cylinder 193, a part of which bleeds through vent 194. This mechanism gently stops plate 65 and enables the apparatus to operate at the higher speeds.

Referring to FIGS. 4 and 20, the gear pairs 99 and 100 that feed and crinkle strip material 96 are driven by a gear 200 carried on a shaft 201. Gear 200 meshes with lower gear 101 of gear pair 99, rotating both gear 101 and lower gear 104 of the other gear pair 100 which is mounted on the same shaft, namely shaft 107. A belt or chain 202 drives shaft 201 and gear 200 in continuous manner from shaft 128 (FIG. 4).

The structure and drive mechanism for piston 60 are best shown in FIGS. 6 and 9. As illustrated, piston 60 has a reduced portion 205 that reciprocates in a tubular bearing 206 in cylinder 45. Reduced portion 205 has an axial bore 207 (FIG. 9) that loosely and non-rotatably receives a headed plunger 210. A spring 211 of predetermined deflection characteristics surrounds plunger 210 and extends between plunger head 212 and the inner end of bore 207. As will be seen, spring 211 cooperates to limit the pressure applied by piston 60 to a level that provides a "fluffy" patty and does not squeeze out the juices, in the case of meat.

Main drive shaft 122 carries a cam member 215 that engages plunger 210. Cam member 215 has a "high" portion that once during each cycle of apparatus operation raises plunger 210 and piston 60 through a compression or molding stroke. Spring 211 yields when the material offers a predetermined resistance, thereby keeping the applied molding pressure within desired limits. A spring 216 is connected between reduced portion 205 of piston 60 and a point on lower support portion 27 to maintain bearing between plunger head 212 and cam member 215 and to lower piston 60 when cam member 215 permits.

As previously mentioned, it is desirable in some instances for piston 60 to rotate within cylinder 45 during the compression or molding stroke. Wear between the piston and cylinder is reduced and distributed more or less uniformly with piston rotation. The frictional relationship between cam member 215 and an off-center part of plunger 210 is sufficient to rotate the piston during the "up" stroke. With spring 216 connected as indicated, the angular range of rotation is limited. If greater angular rotation is desired, a forked pivoted lever or the like (not shown) may engage reduced portion 205 of piston 60, and the spring connected between the lever and a fixed point on lower support portion 27.

Piston rotation during the compression stroke has been found particularly desirable when making comparatively thin meat patties of certain meat mixtures with relatively high meat and room temperatures. The meat in such instances tends to adhere to the face of piston 60 during and at the end of the compression stroke. This adhesion is reduced or broken as the piston rotates, the sliding action between meat and piston serving to derive lubrication action from the fat and juice in the meat. This result from piston rotation is less important with thicker patties of other meat mixtures and lower meat and room temperatures.

Referring to FIGS. 6 and 7, hopper 30 and the associated mechanism for feeding measured quantities of material from the hopper now will be described.

A rotatable vertical shaft 220 extends centrally through bottom 31 of hopper 30. It carries a bevel gear 221 (FIGS. 4 and 6) at its lower end which is journalled in lower support portion 27. The upper end of shaft 220 projects a short distance into the hopper. Gear 221 is driven by associated bevel gear 222 on shaft 223. As shown in FIG. 5, shaft 223 carries a sprocket wheel 224 which is driven by a chain 225 that in turn is driven by a sprocket wheel 226 on main drive shaft 122. Thus, hopper shaft 220 rotates continuously during apparatus operation.

A fixed stop 230 is mounted horizontally within hopper 30 in spaced relation with hopper bottom 31. Stop 230 has one end journalled on shaft 220, and the opposite end secured to the wall of hopper 30. An important feature of the invention is the two-part character of stop 230. Both parts are in effective relation with opening 32 in the hopper bottom, and in spaced relationship with each other in the effective region.

In the form illustrated (FIG. 7) stop 230 is Y-shaped, the stem 231 being journalled on shaft 220. The two arms 232 and 233 are secured to the wall of hopper 30, the former located more or less directly above opening 32 and the latter located forwardly of the opening, referred to the rotational direction of cooperating blades that next will be described.

Shaft 220 carries a pair of blades that extend diametrically of hopper 30, namely, a lower blade 235 and an upper blade 236. Referred to the direction of blade rotation, upper blade 236 leads lower blade 235 by an angle of the order of thirty degrees. This angle may be adjusted, as necessary, for materials of different characteristics. Both blades have a pitch that tends to push material in the hopper downwardly toward opening 32 in the hopper bottom, and in the form illustrated, the pitches of the two blades are about the same.

In the feed arrangement described above, arm 232 which extends above opening 32 is the primary stop for the material in the hopper as the material is pushed by the continuously revolving blades. Generally speaking, the material nearest bottom 31 of the hopper is the material that is pushed or forced through exit opening 32. This material is engaged directly by lower blade 235.

In the absence of the forwardly located arm 233 of stop 230, some materials of certain characteristics tend to slide beneath and beyond primary stop arm 232. In such cases, a requisite quantity of material may not exit through opening 32 during each cycle of apparatus operation. The problem is particularly acute with highly viscous meat of fatty character in the higher temperature ranges.

The present arrangement overcomes this problem by employing the secondary stop arm 233 and leading upper blade 236. These two elements cooperate to apply pressure on the material, usually meat, located in the region between the two arms 232, and 233 of stop 230, i.e., forwardly of primary stop arm 232. The compressed material in this region acts as a wall, and assists lower blade 235 to push or force material through exit opening 32. In other words, the tendency of the material to slide beneath and beyond primary stop arm 232 is resisted, and the material follows the path of lesser resistance through opening 32.

Further describing this improved feed arrangement, the leading upper blade 236 first pushes a quantity of material downwardly toward both of the stop arms 232 and 233. The material that is directed toward secondary stop arm 233 is the material that is compressed rearwardly of and below arm 233, forming the wall mentioned above. This material is located forwardly of opening 32, and thus the imperforate hopper bottom below cooperates to establish this wall of compressed material. As a result, any material pushed by trailing lower blade 235 that tends to slide under and beyond primary stop arm 232 encounters the aforesaid wall of compressed material. The pushed material seeks the path of lesser resistance, and consequently exits from hopper 30 through opening 32 and enters compartment 41.

The quantity of material that exits from hopper 30 during each cycle of apparatus operation may be adjusted as a function of desired patty size. The thickness of mold plate 65 and the diameter of mold opening 66, of course, determine patty size. One usual index of patty size is number of patties per pound of material, and a mold plate 65 is selected that yields such number with the material to be used.

One adjustment for quantity of material discharged from the hopper per cycle is gate 33 that varies the size of exit opening 32. Another is the position of end 51 of feed plate 50 that is adjusted by clamp 165. The angular position of stop 230 in the hopper also is a factor, as are the pitch, speed and separation of blades 235 and 236.

As previously mentioned, the adjustments are set to discharge a slightly greater amount of material than ultimately will be contained in the finished patty. This avoids a deficiency in any patty. The balance of pressures in the feed system and molding operation is such that the slight excess for which the adjustments are set does not produce a pressure build-up. If excess quantity is present, a correspondingly smaller amount of material is discharged from hopper 30 until the excess is reduced.

It will be recalled that cut-off plate 55 has an opening 57 on its longitudinal axis in spaced relation with forward edge 56. The illustrated location of opening 57 is such that the opening is more or less concentric with cylinder 45 and piston 60 when cut-off plate 55 is at an intermediate position between "in" and "out" positions. Alternatively, opening 57 can be located closer to forward edge 56 of cut-off plate 55 so that opening 57 is aligned with cylinder 45 when the end of plate 55 just covers the cylinder. In this case, such position is the "out" position of the cut-off plate 55, and the stroke of plate is shortened accordingly. Opening 57 does not interfere with the previously described actions of the cut-off plate in trapping material in compartment 41, cooperating to transfer the trapped material to the interior of cylinder 45 and separating piston 60 from the material in mold opening 66 (thereby establishing the lower wall of the mold).

Opening 57 is provided in cut-off plate 55 because it offers advantages when using certain types of materials (viscous) under certain temperature conditions (relatively high) for making patties of certain sizes. For example, in making comparatively thin patties of relatively large diameter from pure ground beef, it has been found that improved patties are obtained by inactivating cut-off plate 55 and positioning same so that opening 57 is aligned with cylinder 45. The quantity of material needed for such patties is such that the use of cut-off plate 55 for trapping and tranposrting the material is unnecessary. In such cases the hopper feed mechanism previously described and feed plate 50 alone are capable of feeding and transferring the desired amount of material to cylinder 45.

Describing the operation of the apparatus utilizing cut-off plate opening 57, in the apparatus described above, cut-off plate 55 is rendered stationary and positioned so that opening 57 is concentric with cylinder 45. Feed plate 50 transfers a measured quantity of material to cylinder 45 at a time when piston 60 is in "down" position. Some of this material is extruded through opening 57 into mold opening 66 by means of the controlled (by spring 163) pressure exerted by feed plate 50. The remaining material necessary to fill mold opening 66 is extruded through opening 57 by the controlled or limited pressure exerted by piston 60.

The material passing through central opening 57 flows radially to the circumference of the mold opening and adheres to the peripheral wall of the mold. As this extruding action is accomplished by minimum pressure, the central part of the patty in the mold opening tends to be loosely packed. The looseness in the central portion is accentuated as mold plate 65 moves toward "out" position and the central portion only of the patty is separated from piston 60 as a result of the relative movement between the patty and the stationary edge of opening 57. As previously mentioned, such a patty cooks more quickly because of its less compacted character.

In the case of thicker patties having the same or smaller diameters, it is optional whether to use an opening as above described in cut-off plate 55. With such patties the degree of compaction is essentially the same with or without the opening. Therefore, as the opening is of advantage in some cases, it is preferred to utilize an opening 57 and limit the travel of cut-off plate 55 so that at "out" position, hole 57 is aligned with cylinder 45.

From the above description it is thought that the practice, construction and advantages of the invention will be apparent to those skilled in the art. Various changes in detail may be made without departing from the spirit or losing the advantages of the invention.

Having thus described the invention, what I claim as new and desire to secure by Letters Patent is:

1. The method of making patties of plastic material comprising the steps of:
   separating plastic material in measured quantity from a larger amount;
   transferring the measured quantity of material laterally to a molding station;
   pressing the transferred material into a mold to fill the mold by the application of substantially constant pressure which is effective to discharge excess material laterally from the molding station;
   transferring the mold and contained material laterally;
   ejecting the material from the mold;
   continuously and positively feeding strip material from a roll in mid air to the region below the mold at the ejecting step; and
   severing a length of strip material below the mold in timed relation with each ejecting step, whereby each molded patty falls on a severed length of strip material.

2. The method of claim 1 with the additional steps of crinkling the lateral edges of the strip material and bending a flange on at least one of said edges.

3. Apparatus for making patties of plastic material comprising:
   a support;
   a hopper on said support adapted to contain a supply of plastic material, said hopper having an opening in the bottom;
   means in said hopper adapted to discharge a quantity of plastic material through said hopper opening;

receiving means beneath said hopper opening adapted to receive a quantity of plastic material;

a hollow cylinder on said support adjacent said receiving means;

a reciprocating mold plate having a mold opening at times in communication with said cylinder and at times exterior of said cylinder;

transferring means adapted to transfer plastic material from said receiving means to said cylinder;

a piston in said cylinder adapted to press plastic material in said cylinder into the opening in said mold plate to insure filling said opening, said piston also effective to discharge excess material laterally from said cylinder;

means actuating said transferring means, said mold plate and said piston in timed relation whereby said mold opening when in communication with said cylinder is filled with plastic material; and ejecting means adapted to eject plastic material from said mold opening when the latter is exterior of said cylinder.

4. The combination of claim 3 with the addition of means varying the size of the opening in said hopper bottom.

5. The combination of claim 3 wherein said means in said hopper adapted to discharge plastic material through the hopper opening includes a rotatable shaft; means rotating said shaft, a barrier member spaced above said hopper opening, said member having two horizontally spaced arms extending generally across said hopper opening forming a double barrier, and pusher blades mounted on said shaft immediately above and below said barrier member, the upper blade leading the lower blade.

6. The combination of claim 3 wherein said means in said hopper adapted to discharge plastic material through the hopper opening includes a rotatable shaft; means rotating said shaft, a Y-shaped barrier member spaced above said hopper opening, the stem of said member journalled on said shaft and the arms thereof extending generally across said hopper opening forming a double barrier, and pusher blades mounted on said shaft immediately above and below said barrier member, the upper blade leading the lower blade.

7. The combination of claim 3 with the addition of support means adapted to support plastic material in the opening of said mold plate during the time the opening is exterior of said cylinder until immediately prior to operation of said ejecting means, said support means includes a support plate disposed immediately below said mold plate, a sliding member, said support plate carried by and pivoted on said sliding member, a lost-motion driving connection between said mold plate and said sliding member whereby the latter is driven back and forth by said mold plate when the mold opening is exterior of said cylinder, and a fixed stop engaged by said support plate whereby the latter is caused to pivot away from beneath the mold opening prior to operation of said ejecting means.

8. The combination of claim 3 wherein said transferring means includes a reciprocating feed plate having a forward edge adapted to push plastic material from said receiving means to said cylinder, said feed plate travelling to and from said cylinder during about half a cycle of apparatus operation and dwelling adjacent said receiving means during the remaining half cycle.

9. The combination of claim 8 wherein said transferring means also includes a reciprocating cut-off plate that travels in a plane above said feed plate, said cut-off plate adapted to overlie plastic material in said receiving means and travel with said feed plate when the latter is pushing plastic material from said receiving means to said cylinder.

10. The combination of claim 3 with the addition of a cut-off plate in said cylinder between said piston and said mold plate, said cut-off plate having an opening therein within and of smaller size than the size of the internal cross section of said cylinder, whereby plastic material in said cylinder extrudes through said cut-off plate opening into said mold opening.

11. The combination of claim 3 with the addition of yielding drive means for said piston whereby the maximum pressure exerted by said piston on the plastic material is predetermined.

12. The combination of claim 3 with the addition of drive means for said piston causing piston rotation during the pressure stroke.

13. The combination of claim 3 wherein said ejecting means comprises a first member of external size slightly smaller than the size of the mold opening, a second member telescoping said first member, a resilient connection between said first and second members whereby the lower edge of said second member normally is disposed above the lower edge of said first member, and means driving said first member at least part way into said mold opening with snap action and abruptly stopping same, whereby inertia causes said second member to continue travel into said mold opening.

14. The combination of claim 13 wherein said second member carries spaced elements adapted to score the engaged surface of an ejected patty.

15. The combination of claim 3 with the addition of a roll of strip material rotatably carried on said support, means for feeding strip material from said roll in mid-air to the region below said ejecting means, knife means for severing a length of strip material from said roll in said region, and means actuating said knife means in synchronization with operation of said ejecting means whereby each ejected patty falls on a separative length of strip material.

16. The combination of claim 15 with the addition of means for crinkling the longitudinal edges of the strip material as the strip material approaches the region below said ejecting means.

17. The combination of claim 15 wherein said means for feeding strip material from said roll includes spaced pairs of loosely meshing gears, each longitudinal edge of the strip material passing between a pair of said gears, said gears effective to feed the strip material and crinkle the longitudinal edges thereof.

18. The combination of claim 15 with the addition of a hold-down plate overlying the strip material in the region where the material approaches said knife means, said hold-down plate relieved at a corner adjacent said knife means, and an elevated element at said corner adapted to be engaged by a longitudinal edge of said strip material, said longitudinal edge adapted to be bent upwardly by said element into a flange that maintains the strip material in a generally horizontal plane below said ejecting means.

19. The combination of claim 15 with the addition of a nozzle mounted on said support in spaced relation with the region below said ejecting means, said nozzle directed at the plane of the strip material below said ejecting means, and a source of pressurized air connected to said nozzle, whereby an air stream from said nozzle maintains the strip material in a generally horizontal plane below said ejecting means.

20. The combination of claim 3 with the addition of a roller bearing mounted for rotation adjacent said cylinder and below said mold plate, said bearing extending transversely of and engaged and rotated by said reciprocating mold plate, the surface speeds of said bearing and mold plate being substantially equal, whereby plastic material in the mold opening rolls over said rotating bearing in exiting from said cylinder and is retained in the mold opening.

21. The combination of claim 3 with the addition of inertia damping means in effective relation with said reciprocating mold plate, said inertia damping means slowing the travel speed of said mold plate as the mold opening approaches said ejecting means.

22. The combination of claim 21 wherein said inertia damping means comprises a cylinder having an air vent mounted on said mold plate, a piston within said cylinder, spring means biasing said piston outwardly of said cylinder and a piston rod adapted to engage and be stopped by a fixed part of the apparatus as the mold opening approaches said ejecting means.

23. The combination of claim 8 with the addition of a compression spring connected at one end to said feed plate, and drive means for said feed plate connected to the other end of said compression spring, whereby said spring functions to limit the pressure exerted by said feed plate on the plastic material.

References Cited

UNITED STATES PATENTS

| | | | |
|---|---|---|---|
| 1,942,988 | 1/1934 | Taylor | 93—1 |
| 2,329,287 | 9/1943 | Miller | 264—297 |
| 2,329,288 | 9/1943 | Miller | 264—297 |
| 2,338,939 | 1/1944 | Holly | 17—32 |
| 2,774,104 | 12/1956 | Miller | 107—8 |

WALTER A. SCHEEL, *Primary Examiner.*

J. SHEA, *Assistant Examiner.*